(12) United States Patent
Li

(10) Patent No.: US 10,978,042 B2
(45) Date of Patent: Apr. 13, 2021

(54) METHOD AND APPARATUS FOR GENERATING SPEECH SYNTHESIS MODEL

(71) Applicant: Baidu Online Network Technology (Beijing) Co., Ltd., Beijing (CN)

(72) Inventor: Hao Li, Beijing (CN)

(73) Assignee: BAIDU ONLINE NETWORK TECHNOLOGY (BEIJING) CO., LTD., Beijing (CN)

(*) Notice: Subject to any disclaimer, the term of this patent is extended or adjusted under 35 U.S.C. 154(b) by 145 days.

(21) Appl. No.: 16/053,912

(22) Filed: Aug. 3, 2018

(65) Prior Publication Data

US 2019/0096386 A1 Mar. 28, 2019

(30) Foreign Application Priority Data

Sep. 28, 2017 (CN) .......................... 201710897311.6

(51) Int. Cl.
*G10L 13/027* (2013.01)
*G06N 3/08* (2006.01)
(Continued)

(52) U.S. Cl.
CPC ............ *G10L 13/027* (2013.01); *G06K 9/627* (2013.01); *G06K 9/6256* (2013.01);
(Continued)

(58) Field of Classification Search
CPC ....... G10L 13/00; G10L 13/02; G10L 13/027; G10L 13/08
See application file for complete search history.

(56) References Cited

U.S. PATENT DOCUMENTS 8,527,276 B1* 9/2013 Senior .................... G06N 3/084
704/259
9,195,656 B2 11/2015 Fructuoso et al.
(Continued)

FOREIGN PATENT DOCUMENTS

CN 102982809 A 3/2013
CN 103578462 A 2/2014
(Continued)

OTHER PUBLICATIONS

Arik, Sercan Ö., et al. "Deep voice: Real-time neural text-to-speech." Proceedings of the 34th International Conference on Machine Learning—vol. 70. JMLR. org, 2017. (Year: 2017).*

*Primary Examiner* — Paras D Shah
(74) *Attorney, Agent, or Firm* — Lathrop GPM LLP

(57) ABSTRACT

The present disclosure discloses a method and apparatus for generating a speech synthesis model. A specific embodiment of the method comprises: acquiring a text characteristic of a text and an acoustic characteristic of a speech corresponding to the text used for training a neural network corresponding to a speech synthesis model, fundamental frequency data in the acoustic characteristic of the speech corresponding to the text used for the training being extracted through a fundamental frequency data extraction model, and the fundamental frequency data extraction model being generated based on pre-training a neural network corresponding to the fundamental frequency data extraction model using the speech including each frame of speech having corresponding fundamental frequency data; and training the neural network corresponding to the speech synthesis model using the text characteristic of the text and the acoustic characteristic of the speech corresponding to the text.

7 Claims, 3 Drawing Sheets

(51) Int. Cl.
*G06N 3/04* (2006.01)
*G10L 13/00* (2006.01)
*G10L 19/02* (2013.01)
*G06K 9/62* (2006.01)
*G10L 25/30* (2013.01)

(52) U.S. Cl.
CPC ............. *G06N 3/0445* (2013.01); *G06N 3/08* (2013.01); *G10L 13/00* (2013.01); *G10L 19/02* (2013.01); *G10L 25/30* (2013.01)

(56) References Cited

U.S. PATENT DOCUMENTS

| | | |
|---|---|---|
| 9,542,927 B2 | 1/2017 | Agiomyrgiannakis et al. |
| 2008/0183473 A1* | 7/2008 | Nagano .................... G10L 13/07 704/258 |
| 2013/0218568 A1* | 8/2013 | Tamura .................... G10L 13/06 704/260 |
| 2014/0025382 A1* | 1/2014 | Chen ........................ G10L 13/02 704/260 |
| 2015/0186359 A1* | 7/2015 | Fructuoso ............... G10L 25/30 704/8 |
| 2016/0140951 A1* | 5/2016 | Agiomyrgiannakis ...................... G10L 13/02 704/260 |
| 2017/0092258 A1* | 3/2017 | Edrenkin ................ G10L 13/08 |

FOREIGN PATENT DOCUMENTS

| | | |
|---|---|---|
| CN | 105118498 A | 12/2015 |
| CN | 106653056 A | 5/2017 |

\* cited by examiner

METHOD AND APPARATUS FOR GENERATING SPEECH SYNTHESIS MODEL

CROSS-REFERENCE TO RELATED APPLICATIONS

This application is related to and claims priority from Chinese Application No. 201710897311.6, filed on Sep. 28, 2017 and entitled "Method and Apparatus for Generating Speech Synthesis Model," the entire disclosure of which is hereby incorporated by reference.

TECHNICAL FIELD

The present disclosure relates to the field of computer technology, specifically to the field of speech, and more specifically to a method and apparatus for generating a speech synthesis model.

BACKGROUND

In the process of training a neural network corresponding to a speech synthesis model, the acoustic characteristic of a speech used for the training needs to be utilized. In relation to the fundamental frequency data of the speech in the acoustic characteristic, at the present, the fundamental frequency data in the speech are generally extracted using a mathematical transformation.

When the fundamental frequency data in the speech are extracted by the mathematical transformation, fundamental frequency data of certain speech segments in a speech may be difficult to be extracted. As a result, the fundamental frequency data of the speech used for the training are not complete fundamental frequency data of the speech, which affects the training effect when training the neural network corresponding to the speech synthesis model.

SUMMARY

The present disclosure provides a method and apparatus for generating a speech synthesis model to solve the technical problem mentioned in the foregoing background section.

In a first aspect, the present disclosure provides a method for generating a speech synthesis model. The method includes: acquiring a text characteristic of a text and an acoustic characteristic of a speech corresponding to the text used for training a neural network corresponding to a speech synthesis model, fundamental frequency data in the acoustic characteristic of the speech corresponding to the text used for the training being extracted through a fundamental frequency data extraction model, and the fundamental frequency data extraction model being generated based on pre-training a neural network corresponding to the fundamental frequency data extraction model using the speech including each frame of speech having corresponding fundamental frequency data; and training the neural network corresponding to the speech synthesis model using the text characteristic of the text and the acoustic characteristic of the speech corresponding to the text.

In a second aspect, the present disclosure provides an apparatus for generating a speech synthesis model. The apparatus includes: an acquiring unit, configured to acquire a text characteristic of a text and an acoustic characteristic of a speech corresponding to the text used for training a neural network corresponding to a speech synthesis model, fundamental frequency data in the acoustic characteristic of the speech corresponding to the text used for the training being extracted through a fundamental frequency data extraction model, and the fundamental frequency data extraction model being generated based on pre-training a neural network corresponding to the fundamental frequency data extraction model using the speech including each frame of speech having corresponding fundamental frequency data; and a training unit, configured to train the neural network corresponding to the speech synthesis model using the text characteristic of the text and the acoustic characteristic of the speech corresponding to the text.

In the method and apparatus for generating a speech synthesis model provided by the present disclosure, the text characteristic of the text and the acoustic characteristic of the speech corresponding to the text used for training the neural network corresponding to the speech synthesis model are acquired. The fundamental frequency data in the acoustic characteristic of the speech corresponding to the text used for the training are extracted through the fundamental frequency data extraction model. The fundamental frequency data extraction model is generated based on pre-training the neural network corresponding to the fundamental frequency data extraction model using the speech including each frame of speech having corresponding fundamental frequency data. The neural network corresponding to the speech synthesis model is trained using the text characteristic of the text and the acoustic characteristic of the speech corresponding to the text. The fundamental frequency data of the speech used for the training is extracted using the pre-trained fundamental frequency data extraction model indicating a corresponding relationship between a characteristic of a speech and a characteristic of fundamental frequency data, so that complete fundamental frequency data of the speech used for the training may be used for training the neural network corresponding to the speech synthesis model, thereby improving a training effect.

BRIEF DESCRIPTION OF THE DRAWINGS

After reading detailed descriptions of non-limiting embodiments given with reference to the following accompanying drawings, other characteristics, objectives and advantages of the present disclosure will be more apparent.

DETAILED DESCRIPTION OF EMBODIMENTS

The present disclosure will be further described below in detail in combination with the accompanying drawings and the embodiments. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that the embodiments in the present disclosure and the characteristics in the embodiments may be combined with each other on a non-conflict basis. The present disclosure will be described below in detail with reference to the accompanying drawings and in combination with the embodiments.

Figure 1:
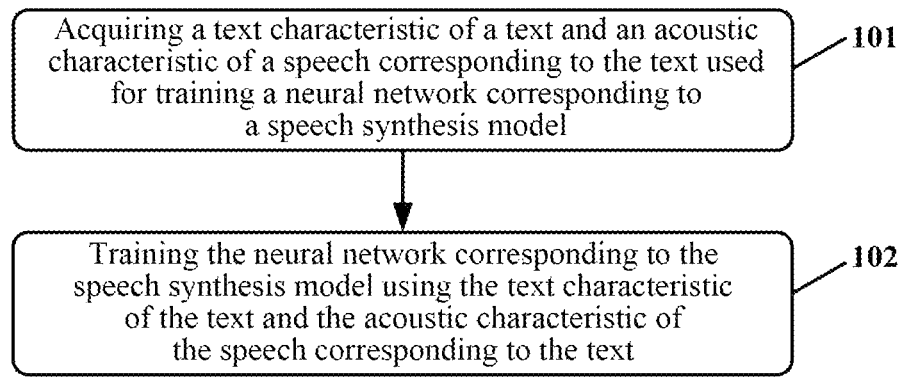
FIG. 1 is a flowchart of an embodiment of a method for generating a speech synthesis model according to the present disclosure.

Referring to FIG. 1, FIG. 1 illustrates a flow of an embodiment of a method for generating a speech synthesis model according to the present disclosure. The method includes the following steps.

Step 101, acquiring a text characteristic of a text and an acoustic characteristic of a speech corresponding to the text used for training a neural network corresponding to a speech synthesis model.

In this embodiment, in order to obtain the speech synthesis model, the neural network corresponding to the speech synthesis model may be trained using a training sample to obtain the speech synthesis model. In other words, the trained neural network corresponding to the speech synthesis model may be used for speech synthesis.

In each training process, the neural network corresponding to the speech synthesis model may be trained using a piece of text and a piece of speech corresponding to the piece of text. The text characteristic may include, but is not limited to, a phoneme included in a word, or a pause between words in the text. The acoustic characteristic of the speech may include, but is not limited to, a spectral parameter and fundamental frequency data.

In this embodiment, when generating the acoustic characteristic of the speech, the fundamental frequency data of the speech corresponding to the text used for the training may be extracted using a fundamental frequency data extraction model.

In this embodiment, a neural network corresponding to the fundamental frequency data extraction model may be pre-trained using the speech including each frame of speech having corresponding fundamental frequency data, to obtain the fundamental frequency data extraction model.

In this embodiment, a time duration of the each frame of speech in the piece of speech is the same. The each frame of speech in the piece of speech used for training the neural network corresponding to the fundamental frequency data extraction model has corresponding fundamental frequency data. For a frame of speech having fundamental frequency data, the fundamental frequency data may be extracted from the frame of speech. In other words, fundamental frequency data may be extracted from each frame of speech in each piece of speech used for training the neural network corresponding to the fundamental frequency data extraction model.

In order to generate the fundamental frequency data extraction model, the neural network corresponding to the fundamental frequency data extraction model may be first created to initialize a parameter of the neural network. When training the neural network corresponding to the fundamental frequency data extraction model, a speech characteristic sequence composed of a characteristic of the each frame of speech in the speech including the each frame of speech having corresponding fundamental frequency data may be used as an input of the neural network corresponding to the fundamental frequency data extraction model, and a fundamental frequency data sequence composed of the fundamental frequency data corresponding to the each frame of speech in the speech including the each frame of speech having corresponding fundamental frequency data may be used as an output of the neural network corresponding to the fundamental frequency data extraction model, to train the neural network corresponding to the fundamental frequency data extraction model in an end-to-end manner. After multiple trainings, the neural network corresponding to the fundamental frequency data extraction model may learn a corresponding relationship between the characteristic of the speech and the fundamental frequency data to obtain the fundamental frequency data extraction model.

In some alternative implementations of this embodiment, a type of the neural network corresponding to the fundamental frequency data extraction model may be a recurrent neural network (RNN). In order to generate the fundamental frequency data extraction model, the RNN corresponding to the fundamental frequency data extraction model may be first created to initialize a parameter of the RNN corresponding to the fundamental frequency data extraction model. When training the RNN corresponding to the fundamental frequency data extraction model, the speech characteristic sequence composed of the characteristic of the each frame of speech in the speech including the each frame of speech having corresponding fundamental frequency data may be set at an input end of the RNN corresponding to the fundamental frequency data extraction model, and the fundamental frequency data sequence composed of the fundamental frequency data corresponding to the each frame of speech in the speech including the each frame of speech having corresponding fundamental frequency data may be set at an output end of the RNN corresponding to the fundamental frequency data extraction model, to perform an end-to-end training on the RNN corresponding to the fundamental frequency data extraction model. After multiple trainings, the RNN corresponding to the fundamental frequency data extraction model may learn the corresponding relationship between the characteristic of the speech and the fundamental frequency data to obtain the fundamental frequency data extraction model. In other words, after multiple trainings, the RNN corresponding to the fundamental frequency data extraction model becomes the fundamental frequency data extraction model.

In some alternative implementations of this embodiment, when pre-training the neural network corresponding to the fundamental frequency data extraction model, the speech used for training the neural network corresponding to the fundamental frequency data extraction model may first be acquired. The fundamental frequency data of the speech used for training the neural network corresponding to the fundamental frequency data extraction model are extracted. Based on the extracted fundamental frequency data of the speech used for training the neural network corresponding to the fundamental frequency data extraction model, a speech segment in the speech used for training the neural network corresponding to the fundamental frequency data extraction model is determined. The speech segment satisfies the following condition: each frame of speech included in the speech segment has corresponding fundamental frequency data. The neural network corresponding to the fundamental frequency data extraction model is trained using the speech segment satisfying the condition.

When training the neural network corresponding to the fundamental frequency data extraction model using the speech segment satisfying the condition, a spectral parameter of the each frame of speech in the speech segment satisfying the condition may be extracted to generate a spectral parameter sequence. The spectral parameter sequence may be used by the neural network corresponding to the fundamental frequency data extraction model to be set at an input end of the neural network corresponding to the fundamental frequency data extraction model, and a fundamental frequency data sequence including the fundamental frequency data corresponding to the each frame of speech in the speech segment satisfying the condition may be set at an output end of the neural network corresponding to the fundamental frequency data extraction model, to train the neural network corresponding to the fundamental frequency data extraction model.

For example, the type of the neural network corresponding to the fundamental frequency data extraction model is RNN. After a piece of speech used for training a RNN corresponding to the fundamental frequency data extraction model is acquired, and fundamental frequency data of the piece of speech are extracted, there may be at least one frame of speech from which corresponding fundamental frequency data cannot be extracted in some speech segments in the piece of speech. Therefore, a speech segment including each frame of speech from which respective corresponding fundamental frequency data may be extracted may be further determined, after the fundamental frequency data of the piece of speech are extracted. Assuming that there are a plurality of speech segments including each frame of speech from which respective corresponding fundamental frequency data may be extracted in the piece of speech after the fundamental frequency data of the piece of speech are extracted, each one of the plurality of speech segments and fundamental frequency data corresponding to each speech segment may be used to train the RNN corresponding to the fundamental frequency data extraction.

When training the RNN corresponding to the fundamental frequency data extraction model using the each one of the plurality of speech segments, a spectral parameter of each frame of speech in the each one of the plurality of speech segments may respectively be extracted, to generate a spectral parameter sequence corresponding to the each one of the plurality of speech segments.

When training the RNN corresponding to the fundamental frequency data extraction model using a spectral parameter sequence corresponding to one speech segment and a fundamental frequency data sequence of fundamental frequency data corresponding to each frame of speech in the speech segment, the spectral parameter sequence may be set at the input end of the RNN corresponding to the fundamental frequency data extraction model, and the fundamental frequency data sequence may be set at the output end of the RNN corresponding to the fundamental frequency data extraction model, to train the RNN corresponding to the fundamental frequency data extraction model in the end-to-end manner.

Step 102, training the neural network corresponding to the speech synthesis model using the text characteristic of the text and the acoustic characteristic of the speech corresponding to the text.

In this embodiment, after the text characteristic of the text used for training the neural network corresponding to the speech synthesis model and the acoustic characteristic of the speech corresponding to the text are acquired through the step 101, the neural network corresponding to the speech synthesis model may be trained using the text characteristic of the text and the acoustic characteristic of the speech corresponding to the text.

When training the neural network corresponding to the speech synthesis model, the text characteristic may be set at an input end of the neural network corresponding to the speech synthesis model, and the acoustic characteristic of the speech may be set at an output end of the neural network corresponding to the speech synthesis model, to train the neural network corresponding to the speech synthesis model in the end-to-end manner.

Figure 2:
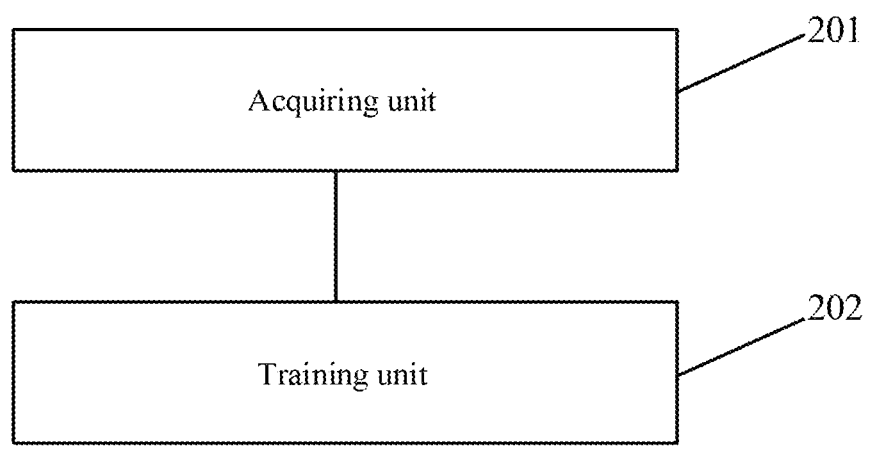
FIG. 2 is a schematic structural diagram of an embodiment of an apparatus for generating a speech synthesis model according to the present disclosure.

Referring to FIG. 2, as an implementation of the method shown in the above figure, the present disclosure provides an embodiment of an apparatus for generating a speech synthesis model. The embodiment of the apparatus corresponds to the embodiment of the method as illustrated in FIG. 1.

As shown in FIG. 2, the apparatus for generating a speech synthesis model includes: an acquiring unit 201, and a training unit 202. The acquiring unit 201 is configured to acquire a text characteristic of a text and an acoustic characteristic of speech corresponding to the text used for training a neural network corresponding to a speech synthesis model. Fundamental frequency data in the acoustic characteristic of the speech corresponding to the text used for the training are extracted through a fundamental frequency data extraction model. The fundamental frequency data extraction model is generated based on pre-training a neural network corresponding to the fundamental frequency data extraction model using the speech including each frame of speech having corresponding fundamental frequency data. The training unit 202 is configured to train the neural network corresponding to the speech synthesis model using the text characteristic of the text and the acoustic characteristic of the speech corresponding to the text.

In some alternative implementations of this embodiment, the apparatus for generating a speech synthesis model further includes a fundamental frequency data extraction model training unit. The fundamental frequency data extraction model training unit is configured to: acquire speech used for training the neural network corresponding to the fundamental frequency data extraction model; extract fundamental frequency data of the speech used for training the neural network corresponding to the fundamental frequency data extraction model; determine, based on the extracted fundamental frequency data of the speech used for training the neural network corresponding to the fundamental frequency data extraction model, a speech segment in the speech used for training the neural network corresponding to the fundamental frequency data extraction model satisfying the following condition: each frame of speech included in the speech segment has corresponding fundamental frequency data; and train the neural network corresponding to the fundamental frequency data extraction model using the speech segment satisfying the condition.

In some alternative implementations of this embodiment, the fundamental frequency data extraction model training unit is further configured to: extract a spectral parameter of the each frame of speech in the speech segment satisfying the condition to generate a spectral parameter sequence; and train the neural network corresponding to the fundamental frequency data extraction model using the spectral parameter sequence and a fundamental frequency data sequence including the fundamental frequency data corresponding to the each frame of speech in the speech segment.

In some alternative implementations of this embodiment, a type of the neural network corresponding to the fundamental frequency data extraction model is a recurrent neural network.

Figure 3:
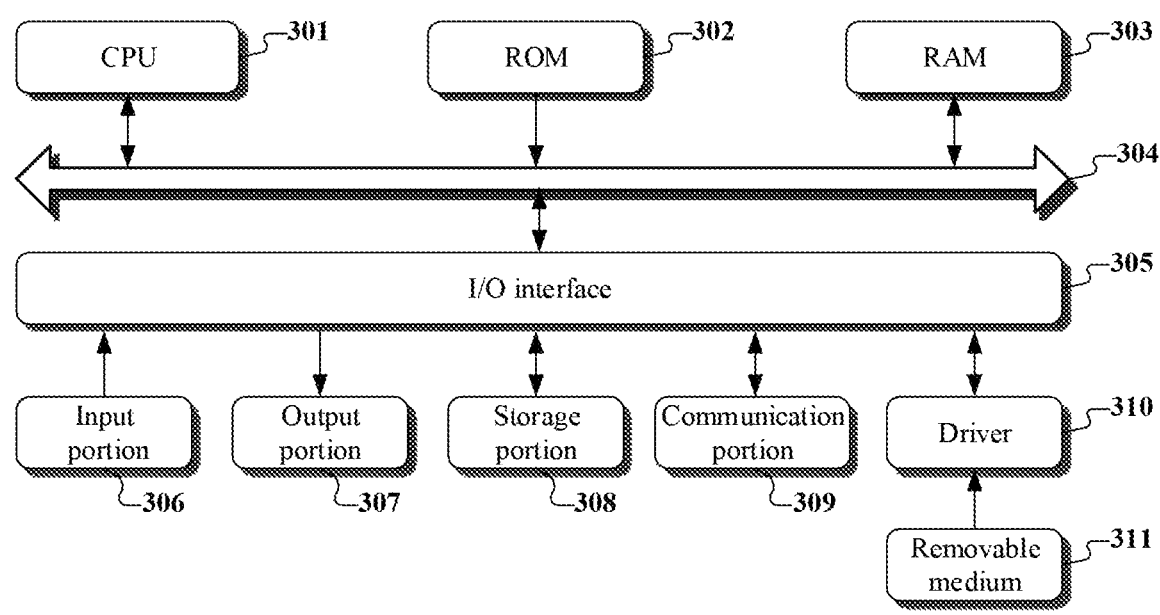
FIG. 3 is a schematic structural diagram of a computer system adapted to implement an electronic device according to embodiments of the present disclosure.

FIG. 3 is a schematic structural diagram of a computer system adapted to implement an electronic device according to embodiments of the present disclosure.

As shown in FIG. 3, the computer system 300 includes a central processing unit (CPU) 301, which may execute various appropriate actions and processes in accordance with a program stored in a read-only memory (ROM) 302 or a program loaded into a random access memory (RAM) 303 from a storage portion 308. The RAM 303 also stores various programs and data required by operations of the system 300. The CPU 301, the ROM 302 and the RAM 303 are connected to each other through a bus 304. An input/output (I/O) interface 305 is also connected to the bus 304.

The following components are connected to the I/O interface 305: an input portion 306 including a keyboard, a mouse etc.; an output portion 307 comprising a cathode ray tube (CRT), a liquid crystal display device (LCD), a speaker etc.; a storage portion 308 including a hard disk and the like; and a communication portion 309 comprising a network interface card, such as a LAN card and a modem. The communication portion 309 performs communication processes via a network, such as the Internet. A driver 310 is also connected to the I/O interface 305 as required. A removable medium 311, such as a magnetic disk, an optical disk, a magneto-optical disk, and a semiconductor memory, may be installed on the driver 310, to facilitate the retrieval of a computer program from the removable medium 311, and the installation thereof on the storage portion 308 as needed.

In particular, according to embodiments of the present disclosure, the process described above with reference to the flow chart may be implemented in a computer software program. For example, an embodiment of the present disclosure includes a computer program product, which comprises a computer program that is tangibly embedded in a machine-readable medium. The computer program comprises program codes for executing the method as illustrated in the flow chart. In such an embodiment, the computer program may be downloaded and installed from a network via the communication portion 309, and/or may be installed from the removable media 311. The computer program, when executed by the central processing unit (CPU) 301, implements the above mentioned functionalities as defined by the methods of the present disclosure.

The present disclosure further provides an electronic device. The electronic device may include one or more processors; and a memory configured to store one or more programs. The one or more programs may contain instructions used to perform the operations described in steps 101-102. The one or more programs, when executed by the one or more processors, cause the one or more processors to perform the operations described in steps 101-102.

The present disclosure further provides a computer-readable storage medium. The computer-readable storage medium may be the computer storage medium included in an electronic device in the above described embodiments, or a stand-alone computer-readable storage medium not assembled into the electronic device. The computer-readable storage medium stores one or more programs. The one or more programs, when executed by an electronic device, cause the electronic device to: acquiring a text characteristic of a text and an acoustic characteristic of a speech corresponding to the text used for training a neural network corresponding to a speech synthesis model, fundamental frequency data in the acoustic characteristic of the speech corresponding to the text used for the training being extracted through a fundamental frequency data extraction model, and the fundamental frequency data extraction model being generated based on pre-training a neural network corresponding to the fundamental frequency data extraction model using the speech comprising each frame of speech having corresponding fundamental frequency data; and training the neural network corresponding to the speech synthesis model using the text characteristic of the text and the acoustic characteristic of the speech corresponding to the text.

It should be noted that the computer readable medium in the present disclosure may be computer readable signal medium or computer readable storage medium or any combination of the above two. An example of the computer readable storage medium may include, but is not limited to: electric, magnetic, optical, electromagnetic, infrared, or semiconductor systems, apparatus, elements, or a combination any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above. In the present disclosure, the computer readable storage medium may be any physical medium containing or storing programs which can be used by a command execution system, apparatus or element or incorporated thereto. In the present disclosure, the computer readable signal medium may include data signal in the base band or propagating as parts of a carrier, in which computer readable program codes are carried. The propagating signal may take various forms, including but not limited to: an electromagnetic signal, an optical signal or any suitable combination of the above. The signal medium that can be read by computer may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions.

The units involved in the embodiments of the present disclosure may be implemented by means of software or hardware. The described units may also be provided in a processor, for example, described as: a processor, comprising an acquiring unit, and a training unit, where the names of these units do not in some cases constitute a limitation to such units or modules themselves. For example, the acquiring unit may also be described as "a unit for acquiring a text characteristic of a text and an acoustic characteristic of speech corresponding to the text used for training a neural network corresponding to a speech synthesis model".

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical characteristics. The inventive scope should also cover other technical solutions formed by any combinations of the above-described technical characteristics or equivalent characteristics thereof without departing from the concept of the disclosure. Technical schemes formed by the above-described characteristics being interchanged with, but not limited to, technical characteristics with similar functions disclosed in the present disclosure are examples.

What is claimed is:

1. A method for generating a speech synthesis model, comprising:

acquiring a text characteristic of a text and an acoustic characteristic of a speech corresponding to the text used for training a neural network corresponding to a speech synthesis model, fundamental frequency data in the acoustic characteristic of the speech corresponding to the text used for the training being extracted through a fundamental frequency data extraction model, and the fundamental frequency data extraction model being generated based on pre-training a neural network corresponding to the fundamental frequency data extraction model using the speech comprising each frame of speech having corresponding fundamental frequency data; and training the neural network corresponding to the speech synthesis model using the text characteristic of the text and the acoustic characteristic of the speech corresponding to the text;

the method further comprising:

acquiring a speech used for training the neural network corresponding to the fundamental frequency data extraction model;

extracting fundamental frequency data of the speech used for training the neural network corresponding to the fundamental frequency data extraction model;

determining, based on the extracted fundamental frequency data of the speech used for training the neural network corresponding to the fundamental frequency data extraction model, a speech segment in the speech used for training the neural network corresponding to the fundamental frequency data extraction model satisfying the following condition: each frame of speech comprised in the speech segment has corresponding fundamental frequency data; and training the neural network corresponding to the fundamental frequency data extraction model using the speech segment satisfying the condition;

the training the neural network corresponding to the fundamental frequency data extraction model using the speech segment satisfying the condition comprising:

using a speech characteristic sequence composed of a characteristic of the each frame of speech in the speech segment comprising the each frame of speech having corresponding fundamental frequency data as an input of the neural network corresponding to the fundamental frequency data extraction model, and using a fundamental frequency data sequence composed of the fundamental frequency data corresponding to the each frame of speech in the speech segment comprising the each frame of speech having corresponding fundamental frequency data as an output of the neural network corresponding to the fundamental frequency data extraction model, to train the neural network corresponding to the fundamental frequency data extraction model.

2. The method according to claim 1, wherein the training the neural network corresponding to the fundamental frequency data extraction model using the speech segment satisfying the condition comprises:

extracting a spectral parameter of the each frame of speech in the speech segment satisfying the condition to generate a spectral parameter sequence; and training the neural network corresponding to the fundamental frequency data extraction model using the spectral parameter sequence and a fundamental frequency data sequence comprising fundamental frequency data corresponding to the each frame of speech in the speech segment.

3. The method according to claim 2, wherein a type of the neural network corresponding to the fundamental frequency data extraction model is a recurrent neural network.

4. An apparatus for generating a speech synthesis model, comprising:

at least one processor; and a memory storing instructions, the instructions when executed by the at least one processor, cause the at least one processor to perform operations, the operations comprising:

acquiring a text feature of a text and an acoustic feature of speech corresponding to the text used for training a neural network corresponding to a speech synthesis model, fundamental frequency data in the acoustic feature of the speech corresponding to the text used for the training being extracted through a fundamental frequency data extraction model, and the fundamental frequency data extraction model being generated based on a neural network corresponding to the fundamental frequency data extraction model pre-trained using the speech comprising each frame of speech having corresponding fundamental frequency data; and training the neural network corresponding to the speech synthesis model using the text feature of the text and the acoustic feature of the speech corresponding to the text;

the operations further comprising:

acquiring a speech used for training the neural network corresponding to the fundamental frequency data extraction model;

extracting fundamental frequency data of the speech used for training the neural network corresponding to the fundamental frequency data extraction model;

determining, based on the extracted fundamental frequency data of the speech used for training the neural network corresponding to the fundamental frequency data extraction model, a speech segment in the speech used for training the neural network corresponding to the fundamental frequency data extraction model satisfying the following condition: each frame of speech comprised in the speech segment has corresponding fundamental frequency data; and training the neural network corresponding to the fundamental frequency data extraction model using the speech segment satisfying the condition;

the training the neural network corresponding to the fundamental frequency data extraction model using the speech segment satisfying the condition comprising:

using a speech characteristic sequence composed of a characteristic of the each frame of speech in the speech segment comprising the each frame of speech having corresponding fundamental frequency data as an input of the neural network corresponding to the fundamental frequency data extraction model, and using a fundamental frequency data sequence composed of the fundamental frequency data corresponding to the each frame of speech in the speech segment comprising the each frame of speech having corresponding fundamental frequency data as an output of the neural network corresponding to the fundamental frequency data extraction model, to train the neural network corresponding to the fundamental frequency data extraction model.

5. The apparatus according to claim 4, wherein the training the neural network corresponding to the fundamental frequency data extraction model using the speech segment satisfying the condition comprises:
  extracting a spectral parameter of the each frame of speech in the speech segment satisfying the condition to generate a spectral parameter sequence; and
  training the neural network corresponding to the fundamental frequency data extraction model using the spectral parameter sequence and a fundamental frequency data sequence comprising fundamental frequency data corresponding to the each frame of speech in the speech segment.

6. The apparatus according to claim 5, wherein a type of the neural network corresponding to the fundamental frequency data extraction model is a recurrent neural network.

7. A non-transitory computer storage medium storing a computer program, the computer program when executed by one or more processors, causes the one or more processors to perform operations, the operations comprising:
  acquiring a text feature of a text and an acoustic feature of speech corresponding to the text used for training a neural network corresponding to a speech synthesis model, fundamental frequency data in the acoustic feature of the speech corresponding to the text used for the training being extracted through a fundamental frequency data extraction model, and the fundamental frequency data extraction model being generated based on a neural network corresponding to the fundamental frequency data extraction model pre-trained using the speech comprising each frame of speech having corresponding fundamental frequency data; and training the neural network corresponding to the speech synthesis model using the text feature of the text and the acoustic feature of the speech corresponding to the text;
the operations further comprising:
acquiring a speech used for training the neural network corresponding to the fundamental frequency data extraction model;
extracting fundamental frequency data of the speech used for training the neural network corresponding to the fundamental frequency data extraction model;
determining, based on the extracted fundamental frequency data of the speech used for training the neural network corresponding to the fundamental frequency data extraction model, a speech segment in the speech used for training the neural network corresponding to the fundamental frequency data extraction model satisfying the following condition: each frame of speech comprised in the speech segment has corresponding fundamental frequency data; and
training the neural network corresponding to the fundamental frequency data extraction model using the speech segment satisfying the condition;
the training the neural network corresponding to the fundamental frequency data extraction model using the speech segment satisfying the condition comprising:
using a speech characteristic sequence composed of a characteristic of the each frame of speech in the speech segment comprising the each frame of speech having corresponding fundamental frequency data as an input of the neural network corresponding to the fundamental frequency data extraction model, and using a fundamental frequency data sequence composed of the fundamental frequency data corresponding to the each frame of speech in the speech segment comprising the each frame of speech having corresponding fundamental frequency data as an output of the neural network corresponding to the fundamental frequency data extraction model, to train the neural network corresponding to the fundamental frequency data extraction model.

* * * * *